US007895362B2

(12) United States Patent
Anderson et al.

(10) Patent No.: US 7,895,362 B2
(45) Date of Patent: Feb. 22, 2011

(54) MULTIPLE MESSAGE SOURCE ELECTRONIC DATA INTERCHANGE (EDI) ENVELOPER WITH BATCHING SUPPORT

(75) Inventors: Rayne S. Anderson, Charlotte, NC (US); Ashutosh Arora, Santa Clara, CA (US); Tuan T. Dang, Raleigh, NC (US); Raja Das, Chapel Hill, NC (US); David W. Hixon, Tampa, FL (US); Sreedhar Janaswamy, Kamataka (IN)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 11/683,046

(22) Filed: Mar. 7, 2007

(65) Prior Publication Data

US 2008/0222651 A1 Sep. 11, 2008

(51) Int. Cl.
*G06F 15/16* (2006.01)
(52) U.S. Cl. .................. 709/246; 709/204; 703/27
(58) Field of Classification Search .................. 709/246
See application file for complete search history.

(56) References Cited

U.S. PATENT DOCUMENTS

| | | | |
|---|---|---|---|
| 5,202,977 A * | 4/1993 | Pasetes et al. ................. | 703/27 |
| 5,812,669 A | 9/1998 | Jenkins et al. | |
| 6,477,647 B1 * | 11/2002 | Venkatraman et al. ...... | 713/193 |
| 6,856,970 B1 * | 2/2005 | Campbell et al. ............. | 705/35 |
| 7,013,426 B1 * | 3/2006 | Ingersoll ..................... | 715/209 |
| 2005/0044197 A1 * | 2/2005 | Lai ............................ | 709/223 |
| 2007/0021951 A1 * | 1/2007 | Lee Seislink ................ | 703/10 |
| 2007/0143334 A1 * | 6/2007 | Gaurav et al. ............... | 707/102 |
| 2007/0143665 A1 * | 6/2007 | Machiraju et al. ........... | 715/513 |
| 2008/0010139 A1 * | 1/2008 | Elmer et al. .................. | 705/14 |
| 2008/0059577 A1 * | 3/2008 | Kalia et al. .................. | 709/204 |
| 2008/0126386 A1 * | 5/2008 | Gaurav et al. ............... | 707/102 |

\* cited by examiner

*Primary Examiner*—Wing F Chan
*Assistant Examiner*—Tesfay Yohannes
(74) *Attorney, Agent, or Firm*—Steven M. Greenberg, Esq.; Carey Rodriguez Greenberg Paul, LLP

(57) ABSTRACT

Embodiments of the present invention address deficiencies of the art in respect to EDI enveloping and provide a method, system and computer program product for multiple message source EDI enveloping with batching support. In one embodiment of the invention, a method for multi-format EDI enveloping can include receiving messages from multiple concurrent message sources, transforming the received messages into an EDI format, inserting the transformed messages into a minimal number of envelopes, and forwarding the envelopes as an EDI interchange to designated trading partners.

13 Claims, 3 Drawing Sheets

MULTIPLE MESSAGE SOURCE ELECTRONIC DATA INTERCHANGE (EDI) ENVELOPER WITH BATCHING SUPPORT

BACKGROUND OF THE INVENTION

1. Field of the Invention

The present invention relates to the field of electronic data interchange (EDI) and more particularly to the field of formatting EDI envelopes in an EDI transaction.

2. Description of the Related Art

Electronic Data Interchange (EDI) relates to the exchange of commercial data in a uniform format between business partners in order facilitate business transactions. Prior to EDI, business partners communicated through paper transactions. Typical paper transactions included quotes, purchase orders, and invoices. As business partners automated operations through computer information systems, paper transactions persisted between business partners wherein the computer information system of one business partner produced paper transactions while the other business partner re-keyed the data in the paper transactions into the computer information system for the recipient business partner.

The re-keying of important transaction data from a paper transaction from a sending business partner into a computer information system of a receiving business partner can be susceptible to human error resulting in improperly keyed data that differs from the data in the computer information system of the sending business partner. Additionally, substantially processing delays can result where human intervention in re-keying business data from a paper transaction is required. EDI provides relief from both human operator error and processing delays by facilitating a purely electronic, automated exchange of business data, thereby obviating the need for a paper transaction.

In EDI, a recipient business partner publishes a set of acceptable EDI transactions and a corresponding format. Transmitting business partners can format internal, commercial data into the published format and can transmit the data to the recipient partner over either the Internet, or more traditionally a value added network. In either case, the recipient partner can receive the properly formatted data and can automatically provide the data as input to an internal data processing system. Thereafter, the intermediary facilitating the exchange between the business partners can be compensated for the transaction.

More specifically, commercial data can be assembled into a form and formatted according to an acceptable format published by the intended recipient business partner. Once assembled, the form can be inserted as a transaction into an EDI envelope. Subsequently, the EDI envelope can be addressed to the target business partner and transmitted to the target business partner. Asynchronously, the target business partner can retrieve the EDI envelope from the inbox and process the form contained therein. Notably, so as to economize on transaction costs, the EDI envelope can include multiple transactions. In this regard, the transactions can be processed in batch mode when received by the target business partner.

At present, the business transactions can be formatted in many different ways. Traditional formats include the extensible markup language (XML), EDI native format and record oriented data (ROD). The enveloping component of the EDI interchange generally is configured to handle one of the formats. Specifically, within a given EDI envelope, all transactions must be formatted uniformly. As such, to the extent that transactions are formatted differently, the differently formatted transactions must be sent in different envelopes, thereby defeating the cost-effectiveness of packaging multiple transactions in a single envelope.

BRIEF SUMMARY OF THE INVENTION

Embodiments of the present invention address deficiencies of the art in respect to EDI enveloping and provide a novel and non-obvious method, system and computer program product for multiple message source EDI enveloping with batching support. In one embodiment of the invention, a method for multiple message source EDI enveloping can include receiving messages from multiple concurrent message sources, transforming the received messages into an EDI format concurrently on separate threads, inserting the transformed messages into a minimal number of EDI envelopes without regard to which thread processed which of the messages, and forwarding the envelopes as an EDI interchange to designated trading partners.

In one aspect of the embodiment, receiving messages from multiple message sources can include receiving disparately formatted messages from multiple message sources. In another aspect of the embodiment, receiving messages from multiple message sources can include defining an enveloping interval, queuing transactions ready to be enveloped and performing the transforming, inserting and forwarding for non-consecutive, queued ones of the messages when the enveloping interval has elapsed. In yet another aspect of the embodiment, receiving messages from multiple message sources can include receiving a batched set of messages in an envelope from a message source, and deconstructing the batched set into the messages.

Notably, transforming the received messages into an EDI format can include transforming at least one of the received messages into multiple different EDI transactions for inclusion in different EDI envelopes. Transforming the received messages into an EDI format also can include transforming at least one of the received messages from one EDI format into a different EDI format.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multiple message source EDI enveloping with batching support. In accordance with an embodiment of the present invention, a single interchange can be created from multiple, differently formatted business transactions, such as those formatted according to EDI, XML or ROD. The single interchange can be created by an enveloper configured for on-demand or schedule driven batch processing of the business transactions. Thereafter, the single interchange can be provided to a target recipient business partner wherein the single interchange can be deconstructed into the constituent, differently formatted business transactions for processing according to EDI.

Figure 1:
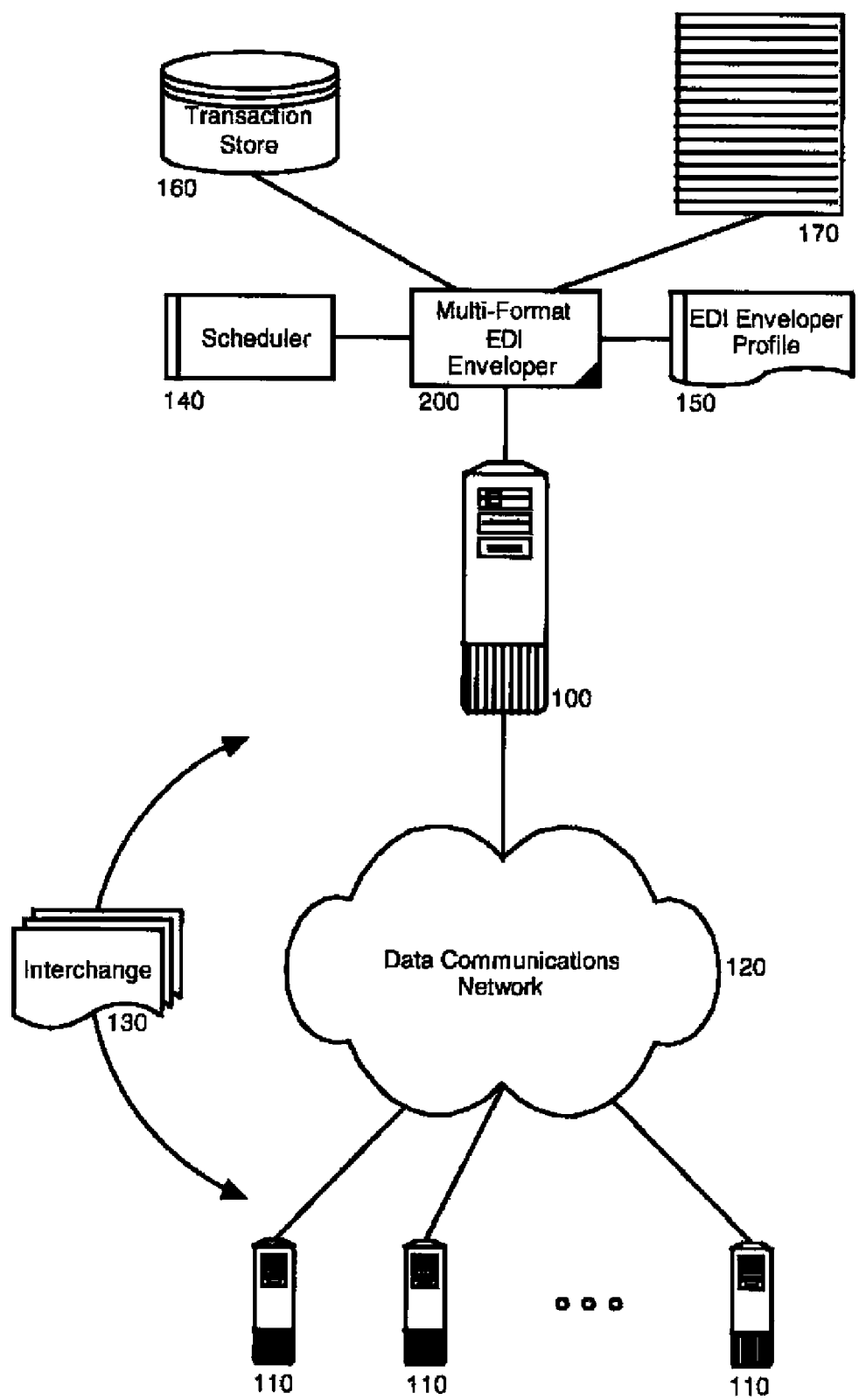
FIG. 1 is an EDI data processing system configured for multiple message source EDI enveloping with batching support.

In further illustration, FIG. 1 is an EDI data processing system configured for multiple message source EDI enveloping with batching support. The system can include a host computing platform 100 configured for communicative coupling to one or more business trading partners 110 over a data communications network 120, including a value added network and the global Internet. The host computing platform 100 can support EDI transactions—namely the transmission of EDI interchanges 130 with different ones of the business trading partners 110.

Notably, the configuration of the host computing platform 100 can support the creation of an EDI interchange with multiple transactions originating from multiple input sources, the transactions having different formats, including EDI native, XML and ROD. In this regard, the host computing platform 100 can be coupled to a multi-input EDI enveloper 200. The multi-input EDI enveloper 200 further can be coupled to each of a scheduler 140, a transaction table 170 and a transaction store 170. Finally, the multi-input EDI enveloper 200 yet further can be coupled to an EDI enveloper profile 150.

The transaction store 160 can include transactions awaiting enveloping. Examples can include a database of transactions, or even a simple file system directory structure. The EDI transaction table 170, by comparison, can include lists of EDI transactions to be considered for enveloping together. Enveloping can result in the generation of one or more envelopes for transactions in the list. Whether or not a transaction is to be included in an envelope with other transactions can be based on whether batching has been activated, and whether the transaction belongs to a batch. Other factors that can be determinative include enveloping criterion such as an envelope break criterion and a group break criterion.

The scheduler 140 can be configured to drive the batching of transactions for EDI enveloping. In particular, the scheduler 140 can invoke the multi-format EDI enveloper 200 periodically at scheduled intervals. The multi-format EDI enveloper 200 in turn can create envelopes, locate a selection of transactions for formatting and placement in the envelopes, retrieve the selected transactions for placement in the envelopes, and transmit the transactions within an EDI interchange with a business trading partner 110. Finally, the EDI enveloper profile 150 can provide envelope definitions mutually agreed upon by the business trading partners 110. To that end, the profile 150 can include the type of delimiters to use to demarcate transactions in an envelope.

Figure 2A:
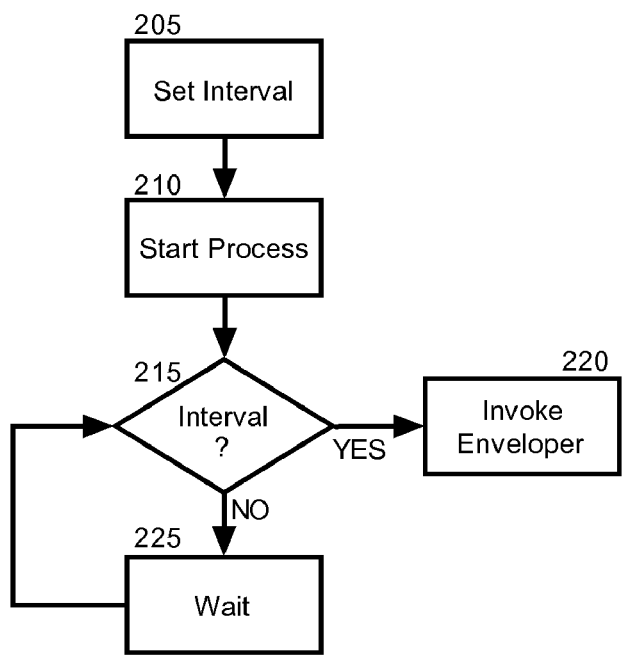
FIGS. 2A and 2B, taken together, are a flow chart illustrating a process for multiple message source EDI enveloping with batching support in the data processing system of FIG. 1; and, FIGS. 3A and 3B, taken together, are a block diagram illustrating a process for multiple message source EDI enveloping with batching support in the data processing system of FIG. 1.
Figure 2B:
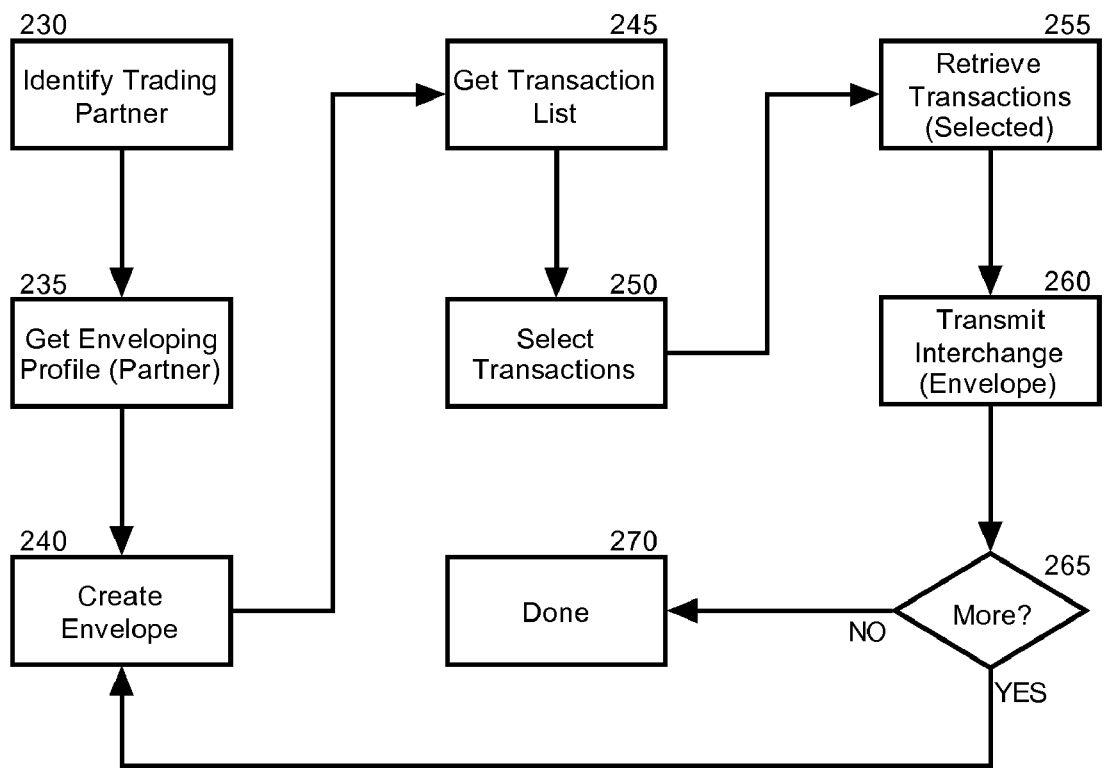

Turning now to FIGS. 2A and 2B, a flow chart is shown illustrating a process for multiple message source EDI enveloping with batching support in the data processing system of FIG. 1. Beginning in block 205, a processing interval can be established for processing incoming transactions. In block 210, the enveloping process can commence and in decision block 215, if the interval for receiving incoming transactions has elapsed, in block 220, the enveloper can be invoked. Otherwise, in block 225 additional incoming transactions can be received and queued for processing.

In block 230, once the enveloper has been invoked, a list of transactions waiting to be enveloped within a transaction store can be sorted such that the transactions can be processed sequentially to yield an optimal number of envelopes. The sorting can be processed according to envelope break criterion. The envelope break criterion can determine which transactions can be packaged within the same envelope. For example, transactions having the same values for envelope profile, trading partner pair of sender Id and receiver Id, or connection qualifier can be packaged within the same envelope.

Thereafter, for each envelope, a trading partner can be identified for receiving an envelope of transactions. In block 235, once a trading partner has been identified, an enveloping profile can be retrieved for the trading partner and in block 240 and envelope can be created for the trading partner. Thereafter, in block 245 a transaction list can be retrieved for transactions received during the interval and in block 250, a selection of transactions can be identified for inclusion in the envelope by reference to the envelope break criterion.

Once identified, the transactions can be retrieved from the transaction store in block 255 for insertion into the envelope. Finally, in block 260, the envelope can be transmitted to the identified trading partner. Subsequently, in decision block 265, it can be determined if additional trading partners are to receive envelopes of transactions as well. If additional trading partners are to receive transactions, the process can repeat through block 240 for each additional trading partner. Otherwise, the process can end in block 270.

Figure 3A:
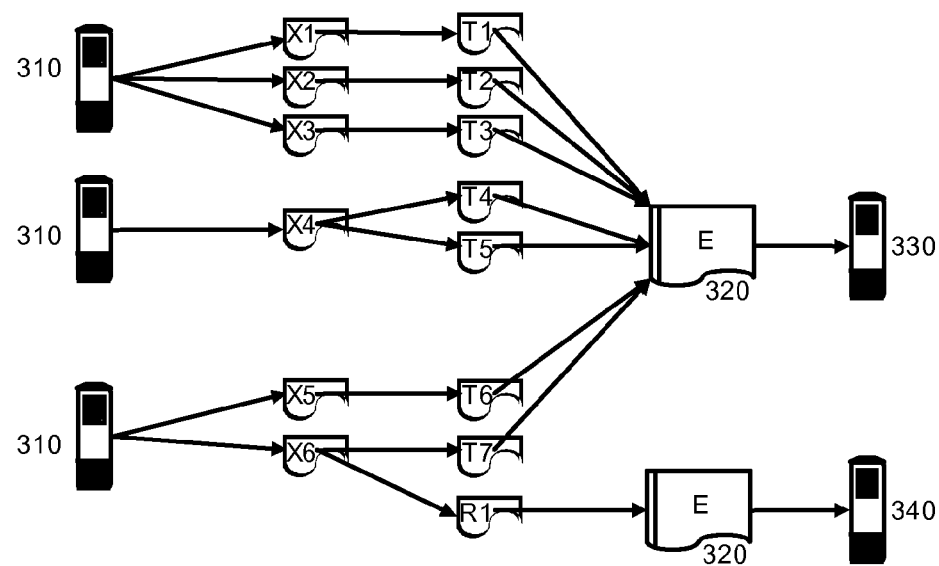

Notably, the enveloping process of FIGS. 2A and 2B can process multiple transactions in batch or real-time in different formats from different sources for inclusion in one or more envelopes for delivery to one or more respective trading partners. In illustration, as shown in FIG. 3A, multiple different transaction sources 310 can provide transactions X1->X6 formatted in one format for delivery to one or more recipient trading partners 330, 340. In particular, a user defined enveloping interval and the enveloper can envelope the transactions which are transformed from Xn->Tn into EDI formatted transactions for inclusion in an EDI envelope 320 As it will be apparent from transactions X4 and X5, a transaction can be transformed into multiple EDI formatted transactions T4, T5 and T6, T7. Additionally, transactions from one source can be separated for inclusion in different envelopes, and to different trading partners as reflected by transaction X6.

Figure 3B:
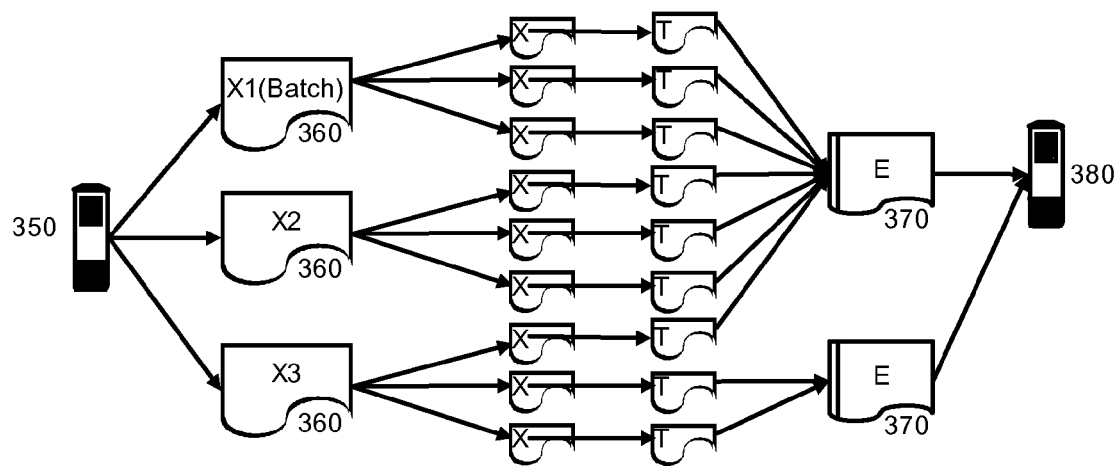

In addition to processing transactions from multiple message sources for a single envelope, the multi-format EDI enveloper also can process batched messages from a single source. In this regard, referring to FIG. 3B, batched messages 360 can be received from a message source 350 and multiple messages X can be retrieved from the batched messages 360. The messages X can be transformed into an EDI format T and included in different envelopes 370 for delivery to one or more designated trading partners 380. Likewise, an envelope can be received from a single message source and deconstructed into respective messages. The messages in turn can be transformed into a different EDI format and repackaged into another EDI envelope for transmission to one or more trading partners.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for multiple message source electronic data interchange (EDI) enveloping, the method comprising:
    receiving in a multi-format EDI enveloper executing in memory of a computer, messages from multiple message sources;
    transforming by the EDI enveloper the received messages into an EDI format;
    inserting by the EDI enveloper the transformed messages into a minimal number of envelopes; and,
    forwarding by the EDI enveloper the envelopes as an EDI interchange to designated trading partners.

2. The method of claim 1, wherein receiving messages from multiple message sources, comprises receiving disparately formatted messages from multiple message sources.

3. The method of claim 1, wherein receiving messages from multiple message sources, comprises:
    defining an enveloping interval;
    queueing messages received from the multiple message sources during the enveloping interval; and,
    performing the transforming, inserting and forwarding for non-consecutive, queued ones of the messages when the enveloping interval has elapsed.

4. The method of claim 1, wherein receiving messages from multiple message sources, comprises:
    receiving a batched set of messages in an envelope from a message source; and,
    deconstructing the batched set into the messages.

5. The method of claim 1, wherein transforming the received messages into an EDI format, comprises transforming at least one of the received messages into multiple different EDI transactions for inclusion in different EDI envelopes.

6. The method of claim 1, wherein transforming the received messages into an EDI format, comprises transforming at least one of the received messages from one EDI format into a different EDI format.

7. An electronic data interchange (EDI) data processing system comprising:
    a processor;
    a memory storage to store data;
    a scheduler;
    a transaction store;
    a transaction table; and,
    a multi-format EDI enveloper executed by the processor and coupled to each of the scheduler, transaction store and transaction table, the enveloper comprising program code enabled to receive messages from multiple message sources, transform the received messages into an EDI format, insert the transformed messages into a minimal number of envelopes, and forward the envelopes as an EDI interchange to designated trading partners.

8. A computer program product comprising:
    a non-transitory computer usable medium embodying computer usable program code for multiple message source electronic data interchange (EDI) enveloping, the computer program product including:
        computer usable program code for receiving messages from multiple message sources;
        computer usable program code for transforming the received messages into an
    EDI format;
        computer usable program code for inserting the transformed messages into a minimal set of envelopes; and,
        computer usable program code for forwarding the envelopes as an EDI interchange to designated trading partners.

9. The computer program product of claim 8, wherein the computer usable program code for receiving messages from multiple message sources, comprises computer usable program code for receiving disparately formatted messages from multiple message sources.

10. The computer program product of claim 8, wherein the computer usable program code for receiving messages from multiple message sources, comprises:
    computer usable program code for defining an enveloping interval;
    computer usable program code for queueing messages received from the multiple message sources during the enveloping interval; and,
    computer usable program code for performing the transforming, inserting and forwarding for non-consecutive, queued ones of the messages when the enveloping interval has elapsed.

11. The computer program product of claim 8, wherein the computer usable program code for receiving messages from multiple message sources, comprises:
    computer usable program code for receiving a batched set of messages in an envelope from a message source; and,
    computer usable program code for deconstructing the batched set into the messages.

12. The computer program product of claim 8, wherein the computer usable program code for transforming the received messages into an EDI format, comprises computer usable program code for transforming at least one of the received messages into multiple different EDI transactions for inclusion in different EDI envelopes.

13. The computer program product of claim 8, wherein the computer usable program code for transforming the received messages into an EDI format, comprises computer usable program code for transforming at least one of the received messages from one EDI format into a different EDI format.

* * * * *